March 29, 1955 R. ERICH 2,705,271
AUTOMATIC TIME SIGNAL SWITCH
Filed March 30, 1953 2 Sheets-Sheet 1

INVENTOR

Reuben Erich

March 29, 1955 R. ERICH 2,705,271
AUTOMATIC TIME SIGNAL SWITCH

Filed March 30, 1953 2 Sheets-Sheet 2

INVENTOR
Reuben Erich

United States Patent Office 2,705,271
Patented Mar. 29, 1955

2,705,271

AUTOMATIC TIME SIGNAL SWITCH

Reuben Erich, Avenal, Calif.

Application March 30, 1953, Serial No. 345,567

9 Claims. (Cl. 200—152)

The invention relates to a combination of inertia and time signal fluid switches to be used on automobiles and other objects subject to velocity changes in which a warning signal operates as a result of a rotation of the switch body, an inertia impulse or a combination of both. The objects of the improvement are; first, to provide facilities for indicating the motion of the accelerator mechanism of an automobile, truck, etc., for a given duration before an automatic break of the electric circuits; second, to provide means to utilize the maximum inertia effect of the conducting fluid to indicate a brake deceleration; third, to provide a practical means to dampen road shock; and fourth, to increase the tilting range of the switch body.

Figure 1:
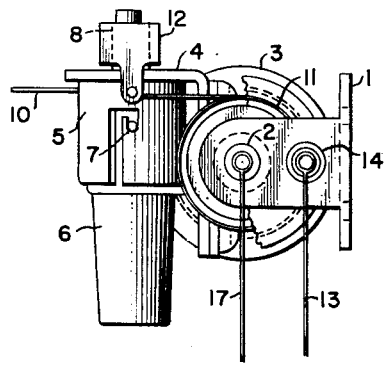
Figure 2:
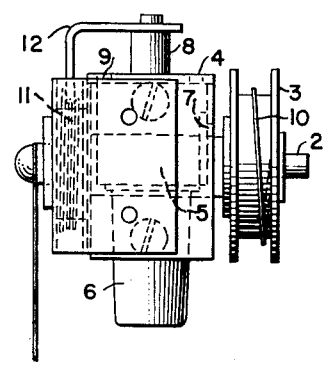
Figure 3:
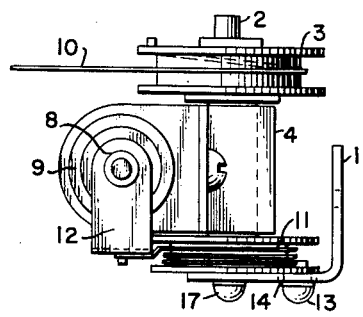
Figure 4:
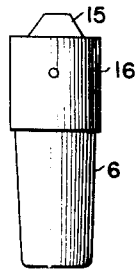
Figure 5:
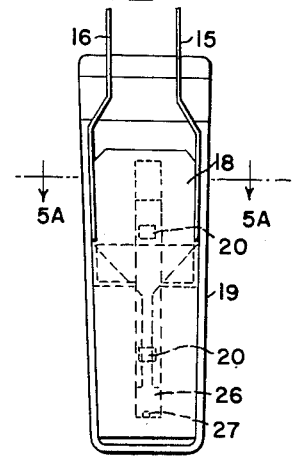
Figure 6:
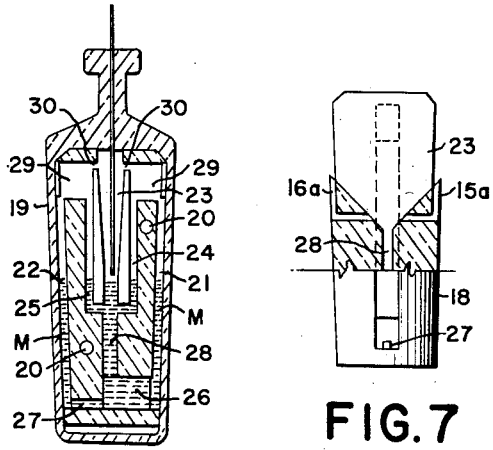
Figures 5A, 7A:
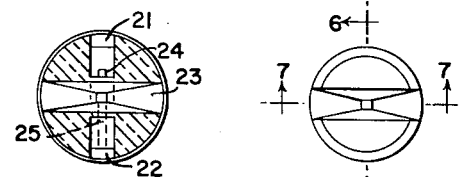
Figure 14:
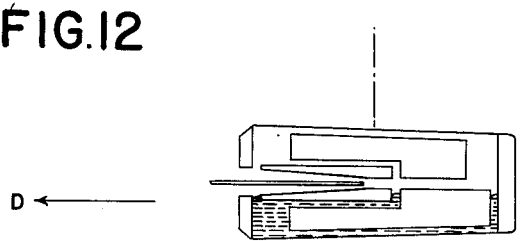

One form of the invention is illustrated in the accompanying drawings in which Figures 1, 2, and 3 represent an elevation, end view and plan view respectively of the complete assembly of the automatic time signal switch, and Figure 4 represents the complete tilt tube withdrawn from the assembly drawings. Figure 5, an elevation and 5A, a horizontal section of the switch tube; Figure 6, an elevation section of the switch tube; Figure 7a, an end view and 7, a plan view of the ceramic insulator. Figures 8, 9, 10, 11, 12 and 13 are skeleton views of the various angular positions assumed by the tilt tube during a series of accelerations and decelerations; Figure 14, a skeleton view of the switch tube at rest on a steep decline.

Consider Figure 1, Figure 2, and Figure 3 of plate I in which a bracket 1 is fixed to some part of a vehicle. A spindle 2, pressed into bracket 1, carries a member 3 made up of a pulley and a long boss rotatively mounted on spindle 2. A member 4 clamped to the boss of member 3 in adjustable relation carries a socket 5 into which the tilt tube 6 is secured by means of a pin 7 and a small compressed spring mounted in head 8. Part 8 is electrically insulated from member 4 by means of an insulating ring 9. A cord 10, fastened to the actuating mechanism of the accelerator of a vehicle or other motor equipment rotates pulley 10 and switch tube 6. Helix spring 11 fastened on bracket 1 and to arm 12 of revolvable member 4 provides suitable tension to cord 10. Electric current from electrode 13 is insulated from bracket 1 by means of insulating sleeve 14 and flows through spring 11 to terminal 15 of tilt tube 6 by means of arm 12. Make and break of the electrical circuit occurs in switch tube 6. Current from terminal 16 of the tilt tube flows through metal revolvable member 4 and metal spindle 2. Electrode 17 conducts the current to its source.

Figure 7:
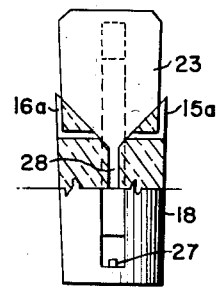

The switch tube 6 with its combination of passages features the invention. Consider Figs. 5, 6, and 7 of plate I in which a tapered ceramic insulator 18 fits tightly into a tapered glass envelope 19 with sealed in electrodes 15 and 16. Ceramic insulator 18 may be made in two similar halves held together by dowels 20. Fig. 6 a half section shows channels 21 and 22 of equal size, 23 a wedge shaped electrode chamber, 24 and 25 dampening tubes, 26 a pump chamber, 27 a small balancing bore, 28 a central passage connecting the tubes, bore and chambers above, 29 displacement wells and 30, vents. Mercury M is placed in the ceramic at the level shown. Mercury behavior when the ceramic is tilted by the mechanism of Figs. 1, 2, and 3 is illustrated on plate 2.

Figure 8:
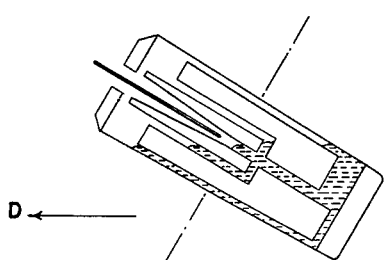
Figure 9:
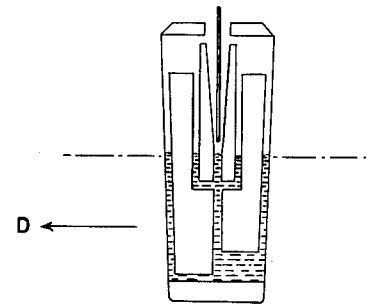
Figure 10:
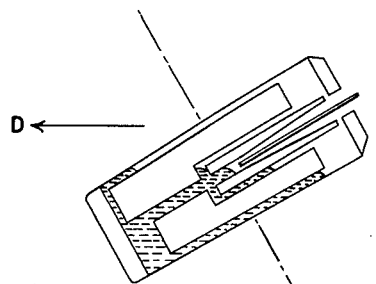
Figure 11:
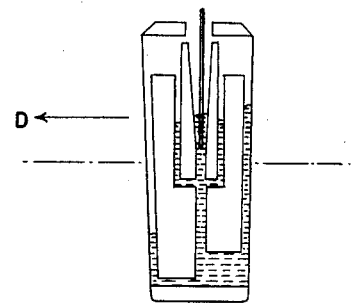
Figure 12:
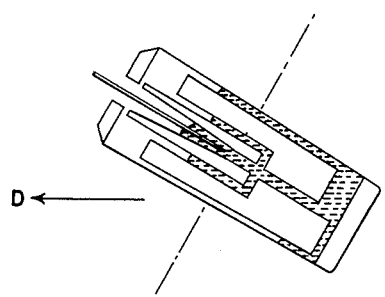
Figure 13:
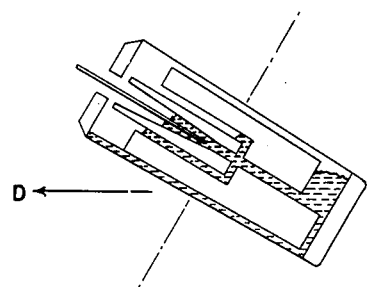

Figure 8 of plate II shows a vehicle at rest or in uniform motoin in direction D with accelerator closed. Mercury does not enter into the electrode chamber. If the vehicle is on an incline, balancing bore 27 of Fig. 6, plate I, maintains a constant level of liquid in central passage 28. Road vibration is dampened by the difference of vibratory rate of the mercury in dampening bores 24, 25, and in channels 21 and 22. Fig. 9, vehicle at uniform velocity with accelerator in mid position and Fig. 10, uniform motion with accelerator extended, Fig. 11, shows rapid return from position 10. Note mercury in electrode chamber before level up time. Position 12, rapid return from position 10 or 11 with mercury in electrode chamber. Level up time will be greater from position 10 than Fig. 11, however. Position 13 with accelerator closed and brakes applied. Fig. 14, mercury position with vehicle at rest on steep decline. The signal duration in the above cases is dependent upon the level up time. With suitable balancing bore 27 any gradual change of ceramic tilt does not affect the switch and also a gradual change of vehicle tilt does not affect the switch thus allowing a wide tilting angle for both ceramic and vehicle.

I have thus described my invention and have indicated the means by which I accomplish my four objectives. I am aware that mercury tilting switches are now used in industry; that they are used to make or break an electric circuit in response to temperature, pressure and other changes; that their operating principle involves a change of liquid head within the switch unit. However, if a commercial mercury tilting switch were mounted on a vehicle as described above, the signal characteristics of the time tilt switch would not obtain. The inherent liquid level up due to road inclination, and road shock dampening features would be lacking. Also it would not be possible to indicate changes of acceleratory position throughout its range.

The invention is also an improvement of my Letters Patent No. 2,236,790 which applies to an inertia switch. Subsequent changes in automotive equipment have reduced the inertia impulse utilized to operate the inertia switch.

I claim:

1. A time signal switch comprising a body containing a U-shaped reservoir with substantially vertical legs of equal and fixed bore, a central coplanar and a parallel riser of equal bore communicating with the lower portion of the vertical legs of the U-shaped reservoir, the said riser be continuous and equal in bore with one vertical leg and connected to the other vertical leg of the U-shaped reservoir by two more coplanar or curved reduced bore passages.

2. A time switch comprising a rotatable body having a reservoir substantially U-shaped, a central intercommunicating riser parallel and coplanar with the two legs of the U-shaped reservoir, a quantity of mercury in the reservoir, the mercury surface in the vertical riser terminating at a point below the upper end of the vertical legs of the U tube such that a rotation of the switch body about a substantially horizontal axis will not displace liquid in the vertical riser of the U-shaped reservoir when rotated through a limiting angle of about 120 degrees.

3. A time switch as in claim 2 in which the upper end of the riser terminates in an electrode chamber whose shape is similar to an inverted regular frustum of a quadrangular pyramid with its base disposed in a plane perpendicular to the vertical axis of the riser and the longitudinal axis of the said base parallel to the axis of rotation of the reservoir.

4. A time switch comprising a body containing a U-shaped reservoir with substantially vertical legs of equal and fixed bore, a central coplanar and parallel riser of equal bore communicating with the lower portion of the two vertical legs of the U-shaped reservoir, a second minor U-shaped intercommunicating tube integral with the central vertical riser of the first U-shaped reservoir at a point above the lower connecting portion, coplanar or at any given dihedral angle with the substantially vertical plane of the U-shaped reesrvoir, the line of intersection of the said planes to coincide with the substantially vertical axis of the central riser of the U-shaped reservoir.

5. A time switch as in claim 4 comprising a rotatable body containing a U-shaped reservoir and a minor U-shaped tube integral with the central vertical riser of the first U-shaped reservoir with rotation of the U-shaped reservoir in substantially a vertical plane and parallel to the vertical plane containing the U-shaped reservoir on a horizontal axis parallel to a horizontal axis at the centroid.

6. A time switch as in claim 5 in which rotation is on a horizontal axis at the centroid of the U-shaped reservoir.

7. A time switch comprising a vertical cylindrical or tapered core body with vertical channels formed on its curved surface, a vertical central bore and a horizontal bore communicating with the vertical central bore and the surface channels near the lower end of the vertical cylindrical or tapered core body, a circumscribing tightly fitting cylindrical or tapered shell forming essentially a U-shaped reservoir and riser with the cylindical or tapered core body.

8. A time signal switch as in claim 1 comprising a U-shaped reservoir with substantially vertical legs of equal and fixed bore, a central coplanar and parallel riser of equal bore communicating with the lower portion of the vertical legs of the U-shaped reservoir, a chamber of larger bore than that of the vertical legs of the U-shaped reservoir and positioned between the lower end of one vertical leg of the U-shaped reservoir and the base of the vertical riser.

9. A time signal switch as in claim 1 in which the upper ends of the two vertical legs of the U-shaped reservoir terminate in intercommunicating and equal volume chambers of greater bore than the bore of the vertical legs of the U-shaped reservoir.

No references cited.